United States Patent
Rani et al.

(10) Patent No.: US 11,036,303 B2
(45) Date of Patent: Jun. 15, 2021

(54) SYSTEMS AND METHODS FOR THREE-DIMENSIONAL (3D) RECONSTRUCTION OF HUMAN GESTURES FROM RADAR BASED MEASUREMENTS

(71) Applicant: Tata Consultancy Services Limited, Mumbai (IN)

(72) Inventors: Smriti Rani, Kolkata (IN); Andrew Gigie, Kolkata (IN); Arijit Chowdhury, Kolkata (IN); Tapas Chakravarty, Kolkata (IN)

(73) Assignee: TATA CONSULTANCY SERVICES LLC, Mumbai (IN)

( * ) Notice: Subject to any disclaimer, the term of this patent is extended or adjusted under 35 U.S.C. 154(b) by 0 days.

(21) Appl. No.: 16/825,140

(22) Filed: Mar. 20, 2020

(65) Prior Publication Data
US 2020/0310549 A1   Oct. 1, 2020

(30) Foreign Application Priority Data
Mar. 29, 2019   (IN) .............................. 201921012645

(51) Int. Cl.
*G06F 3/01* (2006.01)
*G06K 9/00* (2006.01)
(Continued)

(52) U.S. Cl.
CPC .............. *G06F 3/017* (2013.01); *G01S 13/56* (2013.01); *G01S 13/88* (2013.01);
(Continued)

(58) Field of Classification Search
CPC .......... G06F 3/017; G01S 13/56; G01S 13/88; G06K 9/00355; G06K 9/00362;
(Continued)

(56) References Cited

U.S. PATENT DOCUMENTS 8,740,793 B2   6/2014   Cuddihy et al.
10,317,519 B2 *   6/2019   Rohani ................... G01S 13/89
(Continued)

OTHER PUBLICATIONS

Ritchie, M. et al. "Hand Gesture Classification Using 24 GHz FMCW Dual Polarised Radar," *International Conference on Radar Systems (Radar 2017)*, Oct. 23-26, 2017, Belfast, UK; pp. 1-6.

*Primary Examiner* — Mong-Shune Chung
(74) *Attorney, Agent, or Firm* — Finnegan, Henderson, Farabow, Garrett & Dunner LLP

(57) ABSTRACT

This disclosure relates generally to radar based human activity detection, and, more particularly to, systems and methods from radar based human activity detection and three-dimensional (3D) reconstruction of human gestures using configurable panel radar system. Traditional systems and methods may not provide for a separate capturing of top and bottom parts of the human body. Embodiment of the present disclosure overcome the limitations faced by the traditional systems and methods by identifying a user that performed a gesture; detecting each gesture performed by the identified user; generating, by simulating a set of gesture labels, a sensor data and the generated metadata, a two-dimensional (2D) reference database of different speeds of the detected gestures; computing a displacement and a time of the detected gestures via a pattern matching technique; and reconstructing a video of the identified user performing the detected gestures in 3D.

20 Claims, 13 Drawing Sheets

(51) Int. Cl.
  *G06N 20/00* (2019.01)
  *G06K 9/62* (2006.01)
  *G01S 13/88* (2006.01)
  *G01S 13/56* (2006.01)

(52) U.S. Cl.
  CPC ..... *G06K 9/00335* (2013.01); *G06K 9/00362* (2013.01); *G06K 9/6267* (2013.01); *G06N 20/00* (2019.01)

(58) Field of Classification Search
  CPC ...... G06K 9/6267; G06N 20/00; G06N 20/10; G06N 20/20
  See application file for complete search history.

(56) References Cited

U.S. PATENT DOCUMENTS

| | | |
|---|---|---|
| 2011/0032139 A1 | 2/2011 | Benitez et al. |
| 2018/0224980 A1* | 8/2018 | Avila ...................... G01S 13/42 |
| 2018/0341333 A1* | 11/2018 | Molchanov .......... G06K 9/6267 |
| 2019/0108913 A1* | 4/2019 | Coke ...................... A61B 5/746 |
| 2019/0196600 A1* | 6/2019 | Rothberg ................ G06N 20/20 |
| 2019/0389563 A1* | 12/2019 | Swain ................. G06K 9/00832 |
| 2020/0242922 A1* | 7/2020 | Dulberg ........... G08G 1/096783 |

* cited by examiner

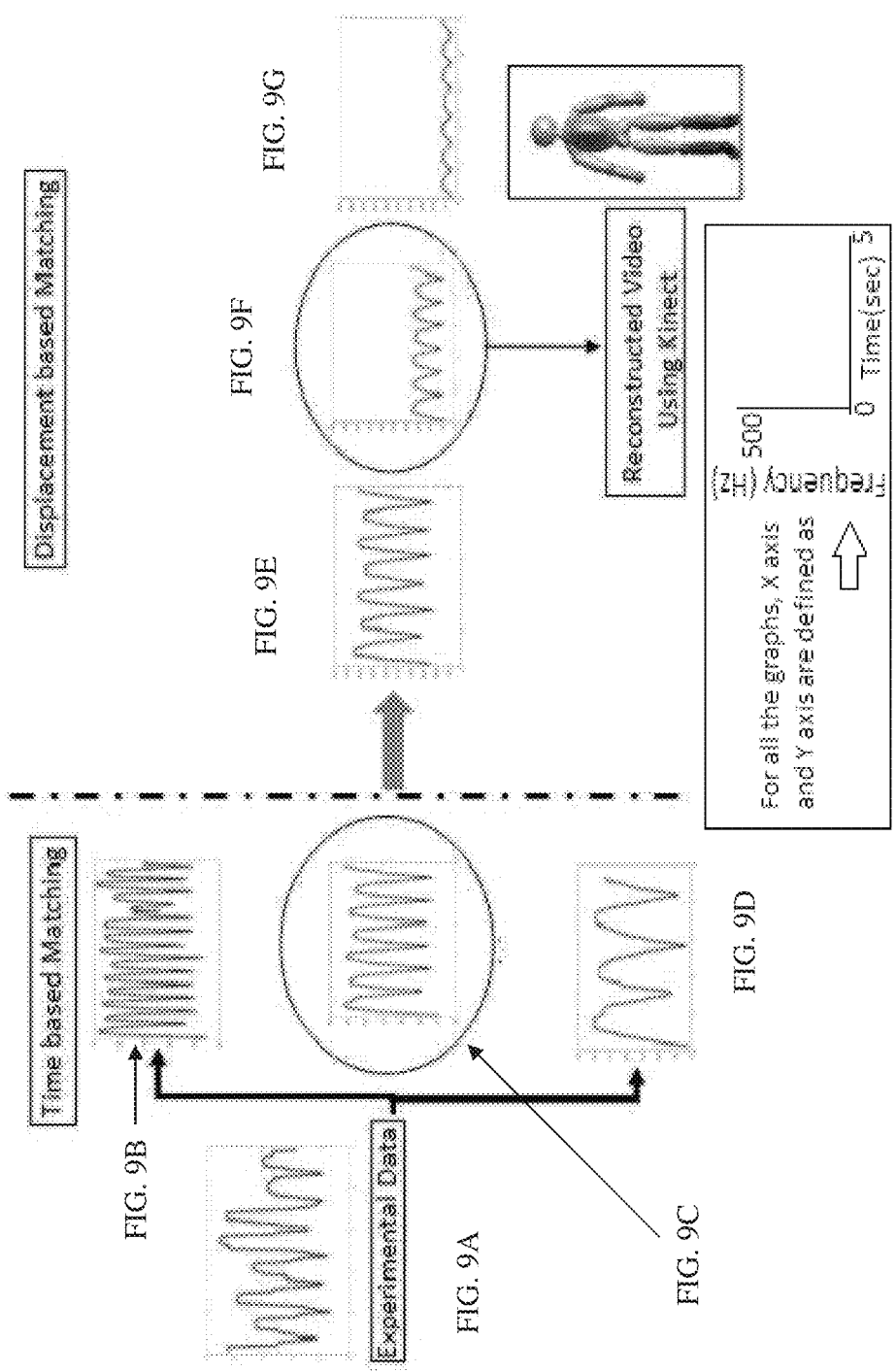

SYSTEMS AND METHODS FOR THREE-DIMENSIONAL (3D) RECONSTRUCTION OF HUMAN GESTURES FROM RADAR BASED MEASUREMENTS

PRIORITY CLAIM

This U.S. patent application claims priority under 35 U.S.C. § 119 to: India Application No. 201921012645, filed on Mar. 29, 2019. The entire contents of the aforementioned application are incorporated herein by reference.

TECHNICAL FIELD

This disclosure relates generally to radar based human activity detection and reconstruction, and more particularly to systems and methods for radar based human activity detection and three-dimensional (3D) reconstruction of human gestures from radar based measurements.

BACKGROUND

Gesture recognition is gaining attention as an attractive feature for the development of ubiquitous, context-aware, Internet-of-Things (IoT) applications. Use of radars as a primary or secondary system provides for multiple technical advantages, as they can operate in darkness, high light intensity environments, and longer distances than many competitor systems. Radar based techniques and devices are capable of providing a radar field that can sense gestures from multiple actors at one time and through obstructions, thereby improving gesture breadth and accuracy over many conventional techniques.

Radar-based gesture recognition systems can interact with applications or an operating system of computing devices, or remotely through a communication network by transmitting input responsive to recognizing gestures. Gestures can be mapped to various applications and devices, thereby enabling control of many devices and applications. Many complex and unique gestures can be recognized by radar-based gesture recognition systems, thereby permitting precise and/or single-gesture control, even for multiple applications. Radar-based gesture recognition systems, whether integrated with a computing device, having computing capabilities, or having few computing abilities, can each be used to interact with various devices and applications. Traditional systems and techniques implementing radars for human gesture identification suffer from various limitations, for example, the traditional systems and techniques simply use a single radar for capturing the entire human body.

SUMMARY

Embodiments of the present disclosure present technological improvements as solutions to one or more of the above-mentioned technical problems recognized by the inventors in conventional systems. For example, in one embodiment, a method for three-dimensional (3D) reconstruction of human gestures from radar based measurements, the method comprising: acquiring, by one or more hardware processors, a time series data on radar measurements of gestures being performed by a plurality of users corresponding to a user database, wherein the time series data is acquired by implementing a configurable panel radar system; performing, by implementing a machine learning classification technique on the acquired time series data, a plurality of steps, wherein the plurality if steps comprise: identifying a user amongst the plurality of users that performed a gesture upon determining that identified the user corresponds to the user database; identifying another user as a user that performed a gesture upon determining that the identified user does not corresponds to the user database; generating a metadata corresponding to the identified another user; and detecting the gestures performed by the identified user or the identified another user, wherein the detected gestures comprise a corresponding set of gesture labels; generating, by simulating the set of gesture labels, a sensor data and the generated metadata, a two-dimensional (2D) reference database of different speeds of the detected gestures, wherein the sensor data corresponds to the identified user or the identified another user; computing, using the 2D reference database, a displacement and a time of the detected gestures by implementing a pattern matching technique; wherein the displacement corresponds to span of limbs of the detected gesture, and wherein the time is time taken to perform the detected gesture; reconstructing, using the computed displacement and time of the detected gestures, a video of the identified user or of the another user performing the detected gestures in 3D via the configurable panel radar system; performing a comparison of a spectrogram of a buffered data with a spectrogram of the 2D reference database to compute the displacement speed and the time speed of the detected gestures, and wherein the buffered data corresponds to the time series data; a first modelling of trajectory of different joints for human gestures based upon the sensor data of the identified user or the identified another user; a second modelling of joints and a modelling of segments between the joints of the identified user or the identified another user as ellipsoids; generating, based upon the ellipsoids, a plurality of radar micro doppler signatures for different gestures of the identified user or the identified another user; generating the plurality of radar micro doppler signatures by computing a Radar Cross Section (RCS) and a distance information of each ellipsoid for reconstructing the 3D video of the identified user or of the another user; and analyzing, based upon the detected gesture, the top and the bottom parts of the body of the identified user or of the identified another user separately via the configurable panel radar system.

In another aspect, there is provided a system for three-dimensional (3D) reconstruction of human gestures from radar based measurements, the system comprising a memory storing instructions; one or more communication interfaces; and one or more hardware processors coupled to the memory via the one or more communication interfaces, wherein the one or more hardware processors are configured by the instructions to: acquire a time series data on radar measurements of gestures being performed by a plurality of users corresponding to a user database, wherein the time series data is acquired by implementing a configurable panel radar system; perform, by implementing a machine learning classification technique on the acquired time series data, a plurality of steps, wherein the plurality if steps comprise: identify a user amongst the plurality of users that performed a gesture upon determining that identified the user corresponds to the user database; identify another user as a user that performed a gesture upon determining that the identified user does not corresponds to the user database; generate a metadata corresponding to the identified another user; and detect the gestures performed by the identified user or the identified another user, wherein the detected gestures comprise a corresponding set of gesture labels; generate, by simulating the set of gesture labels, a sensor data and the generated metadata, a two-dimensional (2D) reference database of different speeds of the detected gestures, wherein the sensor data corresponds to the identified user or the identified another user; compute, using the 2D reference database, a displacement and a time of the detected gestures by implementing a pattern matching technique; wherein the displacement corresponds to span of limbs of the detected gesture, and wherein the time is time taken to perform the detected gesture; reconstruct, using the computed displacement and time of the detected gestures, a video of the identified user or of the another user performing the detected gestures in 3D via the configurable panel radar system; performing a comparison of a spectrogram of a buffered data with a spectrogram of the 2D reference database to compute the displacement speed and the time speed of the detected gestures, and wherein the buffered data corresponds to the time series data; a first modelling of trajectory of different joints for human gestures based upon the sensor data of the identified user or the identified another user; a second modelling of joints and a modelling of segments between the joints of the identified user or the identified another user as ellipsoids; generating, based upon the ellipsoids, a plurality of radar micro doppler signatures for different gestures of the identified user or the identified another user; computing a Radar Cross Section (RCS) and a distance information of each ellipsoid for reconstructing the 3D video of the identified user or of the another user; and analyzing, based upon the detected gesture, the top and the bottom part of the body of the identified user or of the identified another user separately via the configurable panel radar system.

In yet another aspect, there is provided one or more non-transitory machine readable information storage mediums comprising one or more instructions which when executed by one or more hardware processors causes the one or more hardware processors to perform a method for three-dimensional (3D) reconstruction of human gestures from radar based measurements, the method comprising: acquiring a time series data on radar measurements of gestures being performed by a plurality of users corresponding to a user database, wherein the time series data is acquired by implementing a configurable panel radar system; performing, by implementing a machine learning classification technique on the acquired time series data, a plurality of steps, wherein the plurality if steps comprise: identifying a user amongst the plurality of users that performed a gesture upon determining that identified the user corresponds to the user database; identifying another user as a user that performed a gesture upon determining that the identified user does not corresponds to the user database; generating a metadata corresponding to the identified another user; and detecting the gestures performed by the identified user or the identified another user, wherein the detected gestures comprise a corresponding set of gesture labels; generating, by simulating the set of gesture labels, a sensor data and the generated metadata, a two-dimensional (2D) reference database of different speeds of the detected gestures, wherein the sensor data corresponds to the identified user or the identified another user; computing, using the 2D reference database, a displacement and a time of the detected gestures by implementing a pattern matching technique; wherein the displacement corresponds to span of limbs of the detected gesture, and wherein the time is time taken to perform the detected gesture; reconstructing, using the computed displacement and time of the detected gestures, a video of the identified user or of the another user performing the detected gestures in 3D via the configurable panel radar system; performing a comparison of a spectrogram of a buffered data with a spectrogram of the 2D reference database to compute the displacement speed and the time speed of the detected gestures, and wherein the buffered data corresponds to the time series data; a first modelling of trajectory of different joints for human gestures based upon the sensor data of the identified user or the identified another user; a second modelling of joints and a modelling of segments between the joints of the identified user or the identified another user as ellipsoids; generating, based upon the ellipsoids, a plurality of radar micro doppler signatures for different gestures of the identified user or the identified another user; generating the plurality of radar micro doppler signatures by computing a Radar Cross Section (RCS) and a distance information of each ellipsoid for reconstructing the 3D video of the identified user or of the another user; and analyzing, based upon the detected gesture, the top and the bottom parts of the body of the identified user or of the identified another user separately via the configurable panel radar system.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 9A through 9G illustrates the flow of the implemented pattern matching technique for reconstructing a video of a human in 3D, and the reconstructed human in 3D, in accordance with some embodiments of the present disclosure.

DETAILED DESCRIPTION

Figure 1:
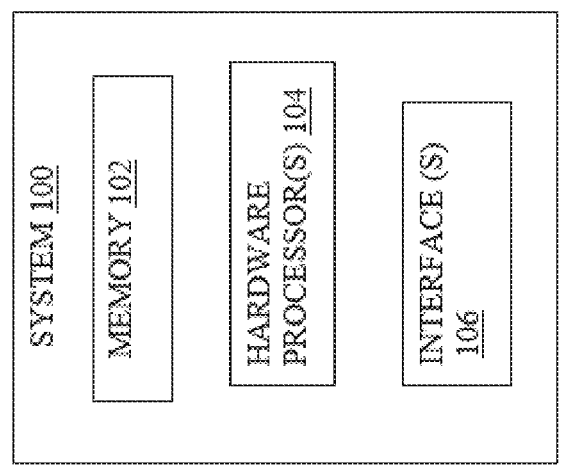
FIG. 1 illustrates a block diagram of a system for three-dimensional (3D) reconstruction of human gestures from radar based measurements, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Embodiments of the present disclosure provide systems and methods for three-dimensional (3D) reconstruction of human gestures from radar based measurements. Radar systems assume an important role in several areas of our daily life, such as air traffic control, speed enforcement systems, and advanced driver assistance systems. In particular, human activity monitoring radar systems are rapidly evolving with applications that include gait recognition, fall motion detection for elderly care technologies.

Radar systems are also being increasingly applied in human motion classifications which include daily activities of walking, kneeling, sitting, standing, bending, falling, and the like. In addition to classifying human motions, radars have been recently used for gesture recognition which is an important problem in a variety of applications that involve smart homes and human-machine interface for intelligent devices.

Traditional systems and methods citing radar based human activity detection and 3D reconstruction suffer from various limitations. For example, the traditional systems and methods use one radar to capture the entire human body. The method disclosed attempts to overcome the limitations faced by the traditional and methods. For example, the method disclosed provides for a human style identification and gesture recognition of humans using machine learning classification(s).

Further, the method disclosed provides for finding micro-Doppler signatures for different gestures and human style identification. The method disclosed also provides for a video reconstruction of a human in 3D based upon pattern matching technique. Finally, the method disclosed implements a configurable panel radar system (with two radars) for individually capturing upper and lower parts of the human body.

Referring now to the drawings, and more particularly to FIG. 1 through 11, where similar reference characters denote corresponding features consistently throughout the figures, there are shown preferred embodiments and these embodiments are described in the context of the following exemplary system and/or method.

FIG. 1 illustrates an exemplary block diagram of a system 100 for three-dimensional (3D) reconstruction of human gestures from radar based measurements, in accordance with an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory 102. In an embodiment, the system 100 can be implemented in a variety of computing systems, such as laptop computers, notebooks, hand-held devices, workstations, mainframe computers, servers, a network cloud and the like.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 102 can be configured to store any data that is associated with the acquiring of the time-series data, two-dimensional (2D) reference database, and reconstruction of a video of a user (or a human) etc. is stored in the memory 102. Further, all information (inputs, outputs and so on) pertaining to 3D reconstruction of human gestures for radar based measurements may be stored in a database, as history data, for reference purpose.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

Figure 2:
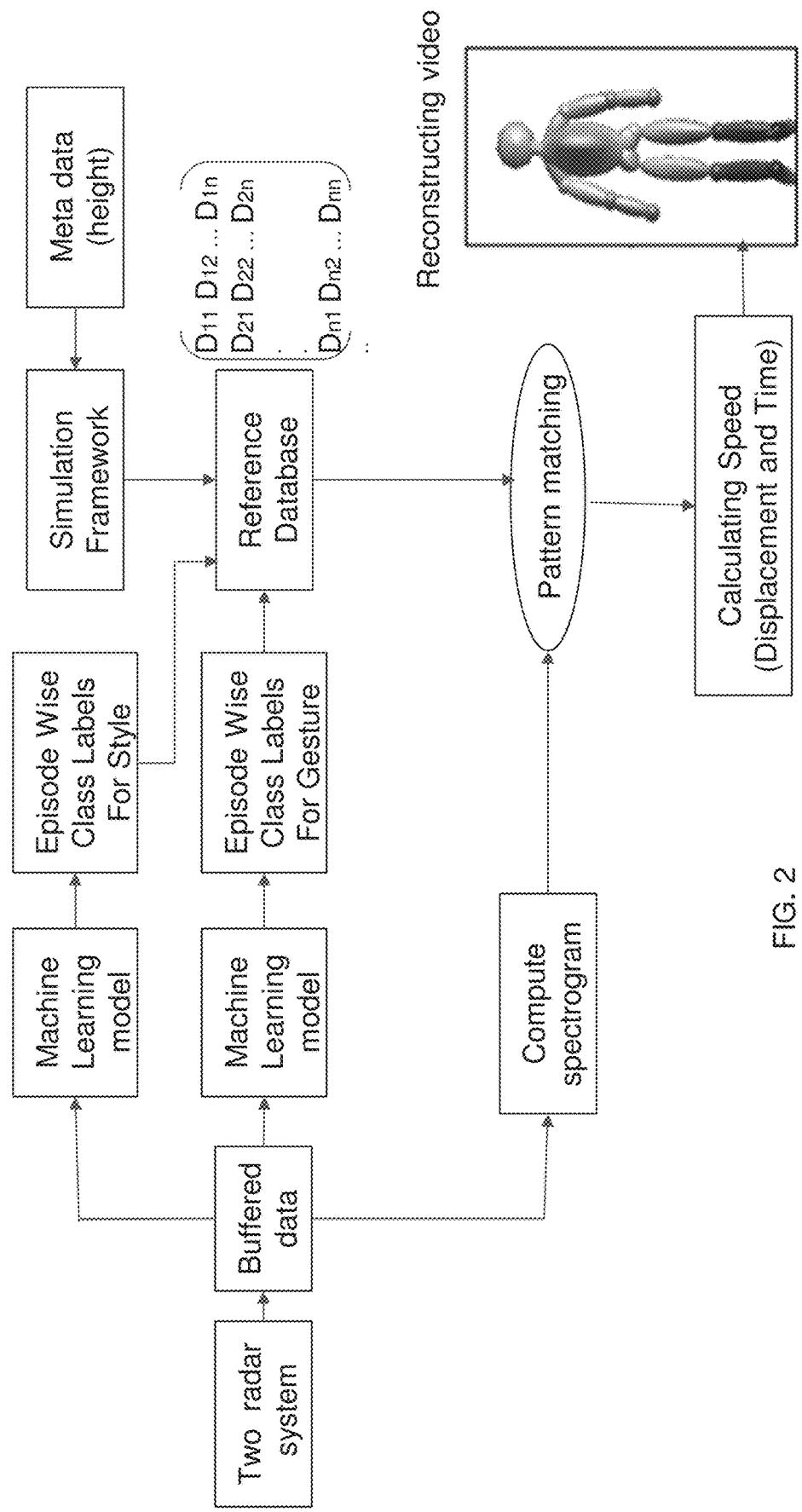
FIG. 2 is an architectural diagram depicting the flow of the system for 3D reconstruction of human gestures from radar based measurements, in accordance with some embodiments of the present disclosure.

According to an embodiment of the present disclosure, by referring to FIG. 2, the architecture of the system 100 for 3D reconstruction of human gestures from radar based measurements may be referred. By referring to FIG. 2, it may be noted that initially, the data is buffered and then machine learning technique is applied to identify a user and gestures performed by such user, along with gesture labels. Sensor data (if any) may then be generated and simulated with the gesture labels to generate a reference database. Finally, a displacement and a time of the detected gestures is computed via a pattern matching, by implementing a pattern matching technique. The 3D reconstruction of human gestures for radar based measurements by using a configurable panel radar system has been explained in steps 301 through 304 with examples in subsequent paragraphs.

Figure 3:
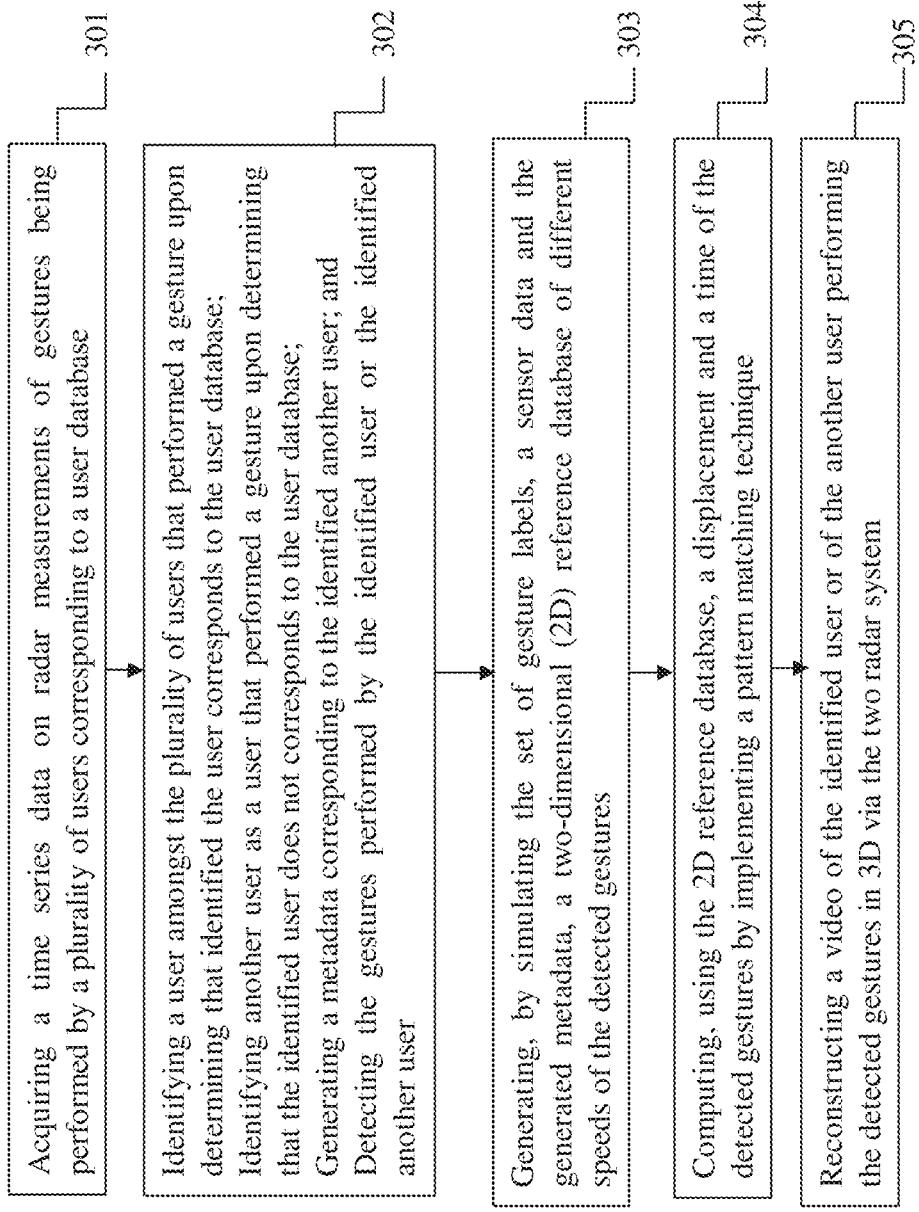
FIG. 3 is a flow diagram illustrating the steps involved in the process of 3D reconstruction of human gestures from radar based measurements, in accordance with some embodiments of the present disclosure.

FIG. 3, with reference to FIG. 1 and FIG. 2, illustrates an exemplary flow diagram of a method for 3D reconstruction of human gestures from radar based measurements, in accordance with some embodiments of the present disclosure. In an embodiment the system 100 comprises one or more data storage devices of the memory 102 operatively coupled to the one or more hardware processors 104 and is configured to store instructions for execution of steps of the method by the one or more processors 104. The steps of the method of the present disclosure will now be explained with reference to the components of the system 100 as depicted in FIG. 1 and the flow diagram. In the embodiments of the present disclosure, the hardware processors 104 when configured the instructions performs one or more methodologies described herein.

According to an embodiment of the present disclosure, at step 301, the one or more hardware processors 104 are configured to acquire, by implementing the configurable panel radar system, a time series data on radar measurements of gestures being performed by a plurality of users. In general, radars may be used to measure and detect human activities, wherein such human activities denote locomotion, limb movements, and the like. Traditional systems and methods cite using dual channel in-phase quadrature-phase (IQ) or Frequency Modulation Continuous Wave FMCW™ based radars for detecting human gestures, however, none of the traditional systems and methods cite radar-based identification of human activities and 3D reconstruction for visual analysis and monitoring using human body model(s).

Figure 4:
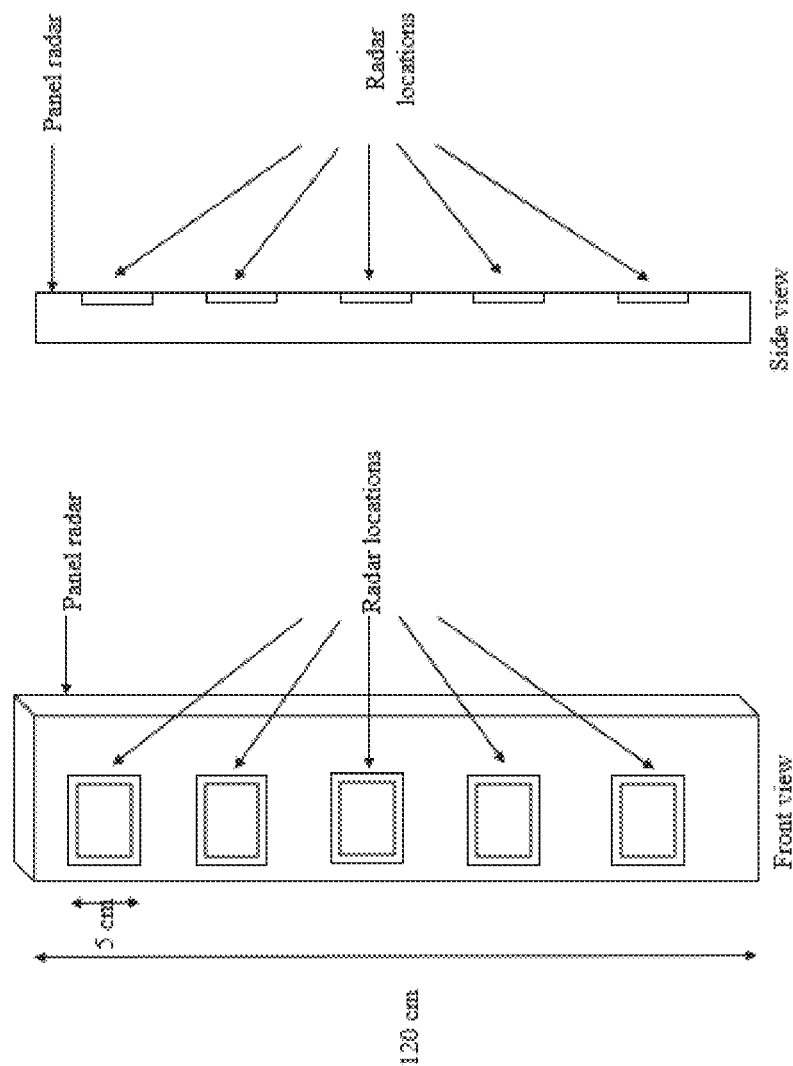
FIG. 4 is an architecture of a configurable panel radar system used for 3D reconstruction of human gestures from radar based measurements, in accordance with some embodiments of the present disclosure.

By referring to FIG. 4, the architecture of the configurable panel radar system in general may be referred. By referring to FIG. 4, it may be noted that the configurable panel radar system (with an information of motion doppler frequency) comprises panel radar, wherein the panel radar is a configurable radar, and may comprise of a plurality of radars (with number of radars depending upon various requirements, for example, cost and accuracy, and the like) at different locations placed vertically from a user (amongst the plurality of users). Depending upon certain parameters such as the distance of the subject from the radars, average height deviation of subjects of interest, and the like, the location of the configurable panel radar system may be selected via the panel radar.

Figure 5:
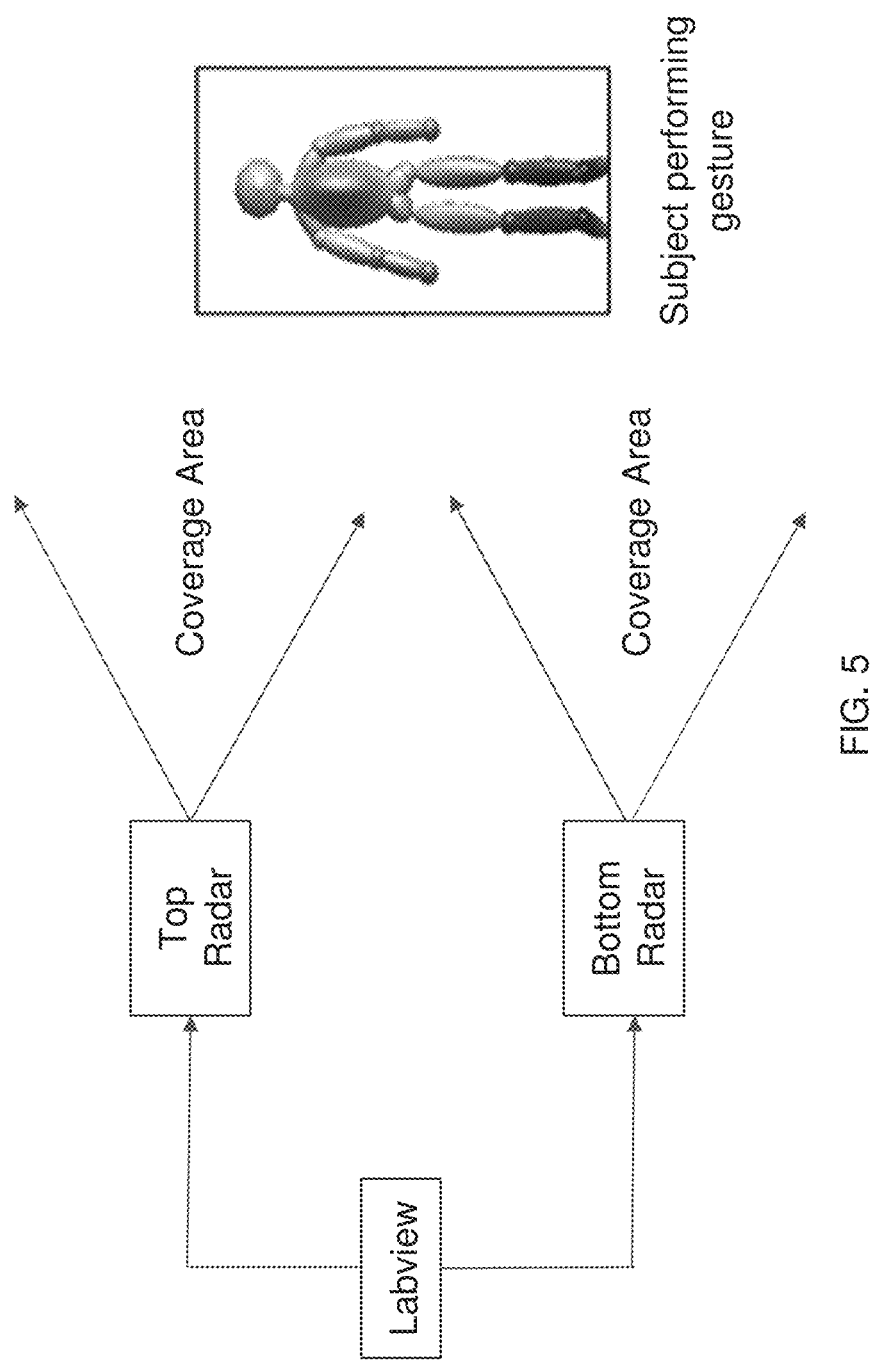
FIG. 5 illustrates the process and of acquiring a time series data via the configurable panel radar system, in accordance with some embodiments of the present disclosure.
Figure 6:
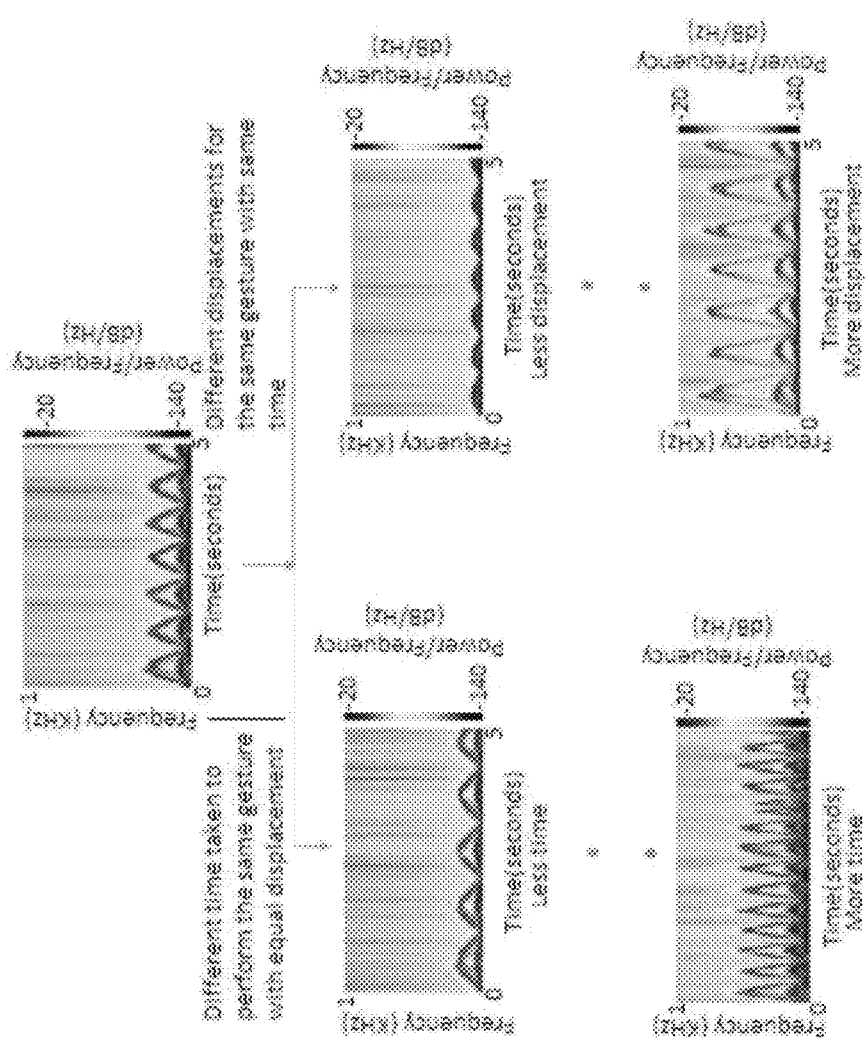
FIG. 6 illustrates an example of a generated 2D reference database and a complete data extrapolation with different speeds of detected gestures (in the 2D reference database), in accordance with some embodiments of the present disclosure.

In an embodiment, by referring to FIG. 5, the process of acquiring the time series data via the configurable panel radar system may be referred. By referring to FIG. 5 again, it may be noted that the configurable panel radar system comprises of two radars vertically placed at a distance from each other, such that, the individual beam (of each of the two radars) widths illuminate the top and bottom parts of a human.

While the traditional systems and methods cite placing a single radar, wherein the single radar fuses the radar signatures of the top and bottom portion of the body, the method disclosed implements a HB100™ radar having a beam width of 80 degree in horizontal and 40 degree beam angle in vertically. Thus, by using the configurable panel radar system, the method disclosed provides for an optimized correlation between the two radars, thereby facilitating an on optimized classification of the radar gestures. Considering an example scenario, the time series data may be acquired as:

gesture 1—Swinging right leg;
gesture 2—Hands exercising inward and outward, parallel to ground; and
gesture 3—Swinging right leg and right hand According to an embodiment of the present disclosure, at step 302, the one or more hardware processors 104 are configured to perform a plurality of steps on the acquired time series data. At step 302, initially, the one or more hardware processors 104 are configured identify, by implementing a machine learning classification technique, at least one user (amongst the plurality of users) that performed a gesture, upon determining that identified the user corresponds to the user database. If the identified user does not corresponds to the user database, the identified user is classified as another user by the machine learning classification technique. Finally, the gestures performed by the identified user or the identified another user are detected. The process of identification of the user and detection of the gestures via the machine learning classification technique may now be considered in detail.

In general, a machine learning classification model attempts to draw some conclusion from observed values. Given one or more inputs, a classification model attempts to predict the value of one or more outcomes. In short, classification either predicts categorical class labels or classifies data (construct a model) based on the training set and the values (class labels) in classifying attributes and uses it in classifying new data. Classification models comprise logistic regression, decision tree, random forest, gradient-boosted tree, multilayer perceptron, one-vs-rest, and Naive Bayes.

In an embodiment, using the acquired time series data, the method disclosed makes two classification models and the one or more hardware processors 104 further perform a buffering of the acquired time series data. The first classification model identifies or detects the user (or the subject) and his/her corresponding style-id. The user is identified by feeding the buffered data to a trained classifier to detect the user (or the subject) who has performed the gesture by doing gait analysis.

If an unknown subject style which is not in the user database is detected or is identified as being performing a gesture, the first classification model predicts the closest resembling subject styles/ID's, (that is the style of the identified user or of the identified another user) with some degree of probability. Further, each such user's class label is also embedded with certain metadata such as age (old or young), athletic/non athletic, gender, height category (Tall/Medium/Short), degree of fatness etc. The first classification model generates the metadata of the identified another user. Finally, the first classification model fuses the metadata of said resembling subject styles, and the one or more hardware processors 104 generate the required parameters for simulating the unknown person's reference database.

In an embodiment, the second classification model takes the acquired time series data as an input and detects the gestures performed by the identified user or the identified another user, wherein the detected gestures comprise a corresponding set of gesture labels. Each gesture label amongst the set of gesture labels corresponds to a window. Each window is then stitched together to form episodes (for example, five seconds or more). If a majority of windows in an episode denote a particular gesture, it may be concluded that the identified user or the identified another user has performed that gesture during that episode. By referring to FIG. 5 yet again, an example of the identified user or the identified another user performing the gesture may be referred.

According to an embodiment of the present disclosure, at step 303, the one or more hardware processors 104 are configured to generate, by simulating the set of gesture labels, a sensor data and the generated metadata, a two-dimensional (2D) reference database of different speeds of the detected gestures, wherein the sensor data is an initial data on the subject's style, that is, style of the identified user or of the identified another user (from example, height, weight, age etc.) collected via the system 100 from joint trajectories of the identified user or the identified another user. For the generation of the 2D reference database, two simulated radars (of the configurable panel radar system) are placed at a fixed distance from each other and the subject of interest, such that it emulates the physical configurable panel radar system. As mentioned supra, the machine learning classification technique facilitates identification of the user (or the identification of another user), the corresponding gesture(s) performed by the identified user or the identified another user, and the detected gestures comprise the corresponding set of gesture labels.

In an embodiment, the set of gesture labels, the generated metadata (in case of the identified another user), and the sensor data is fed into a simulation framework. The simulation framework simulates the set of gesture labels, the generated metadata and the sensor data to generate the 2D reference database of different speeds of the detected gestures. Considering an example scenario, by referring to FIG. 6, an example of the generated 2D reference database for hand Swinging gesture, by manipulating the displacement and time may be referred. Since upper part of the body has motion, the top radar is analyzed in FIG. 6. Depending upon the gesture performed the top and bottom part of the body may be analyzed separately via the configurable panel radar system.

In an embodiment, the step of simulating comprises a first modelling of trajectory of different joints for human gestures based upon the sensor data of the identified user or the identified another user. Further, the simulating facilitates a second modelling of joints and a modelling of segments between the joints of the identified user or the identified another user as ellipsoids. It may be noted that the method disclosed does not provides for mathematical modelling of the joint trajectories.

Figure 7D:
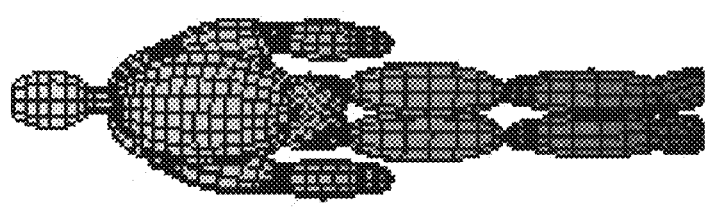
FIG. 7A through 7D illustrates an example of different views of a reconstructed human, generated on the basis of a first modelling and a second modelling, and with body parts modelled as ellipsoids, in accordance with some embodiments of the present disclosure.
Figure 7C:
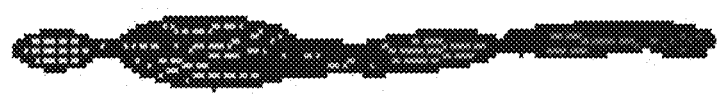
Figure 7B:
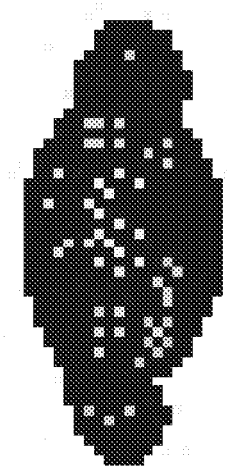
Figure 7A:
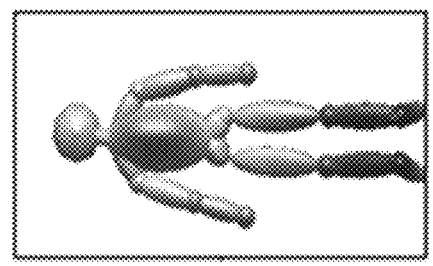
Figure 8A:
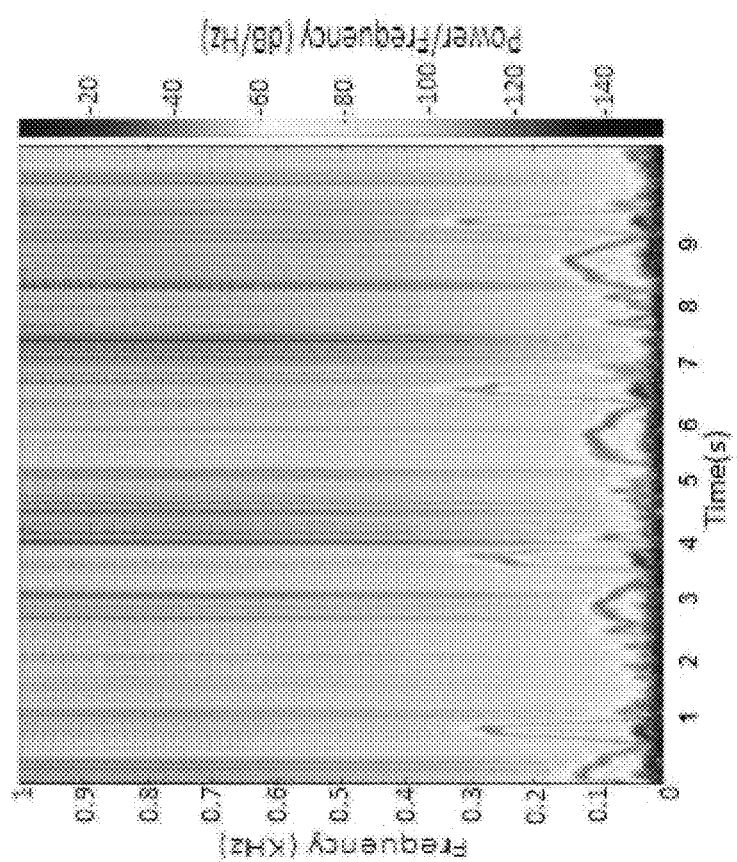
FIG. 8A through 8B illustrates graphically, an example of generated plurality of radar micro doppler signatures (spectrogram), in accordance with some embodiments of the present disclosure.
Figure 8B:
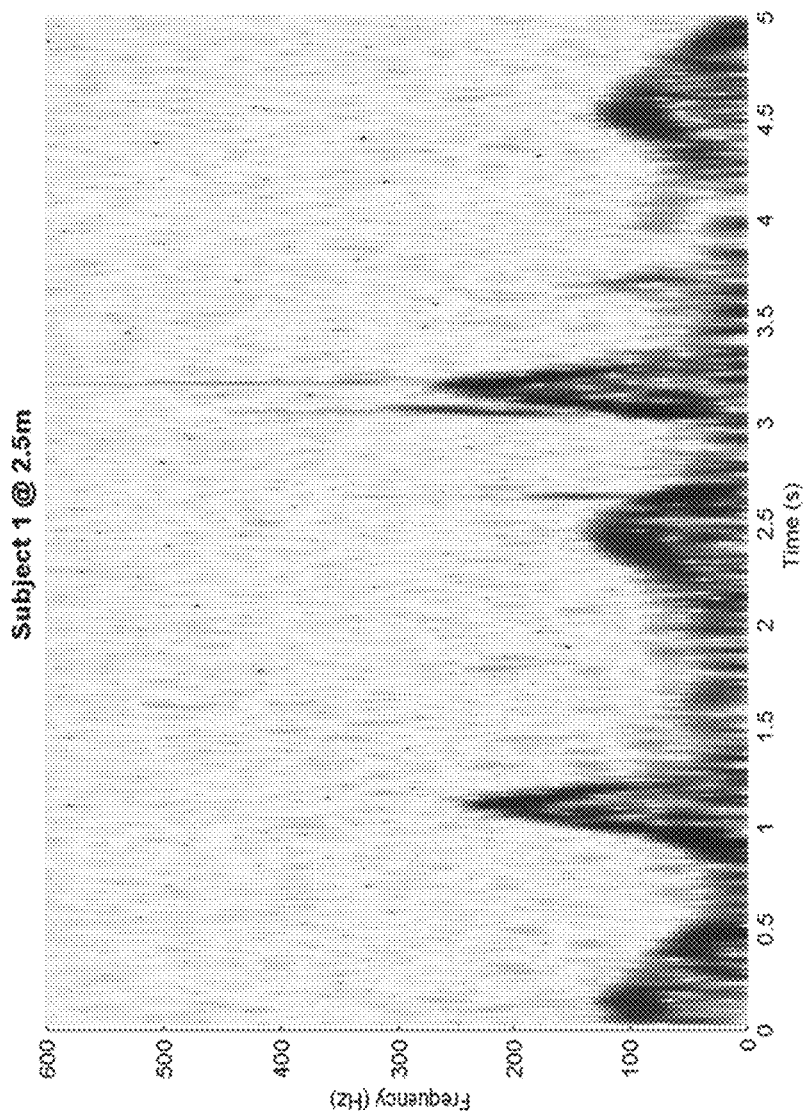

By referring for FIG. 7A through 7D, an example of a reconstructed human, generated on the basis of the first modelling and the second modelling, and with body parts modelled as ellipsoids may be referred, wherein FIG. 7A illustrates an overall view, FIG. 7B illustrates a top view, FIG. 7C illustrates a side view and, finally FIG. 7D illustrates a front view respectively, of the reconstructed human.

In an embodiment, the height of the reconstructed human and approximate parameters for the ellipsoids may be tuned according to the individual subjects of interest (for example average height deviation of the identified user of the identified another user etc.). As mentioned supra, for the generation of the 2D reference database, the two simulated radars are placed at a fixed distance from each other and the subject of interest, such that it emulates the physical configurable panel radar system. The simulating facilitates computing radar signatures of top and bottom parts of the body separately, which may then be used for a comparison with the radar signatures of physical configurable panel radar system.

In an embodiment, a Radar Cross Section (RCS) and a distance information of each ellipsoid may be plugged and combined, and then fused to a basic radar equation, denoted by equation (1) below, wherein RCS Computation: For computing the RCS of ellipsoids, Theta θ, Phi ø and the three axis lengths of ellipsoids are required.

The distance information of each joint is obtained as below:

$$\text{Radar Return} = \Sigma \text{Data}(k,1) = \Sigma \Sigma \text{amp}(j,k) * \cos(4*pi*\text{distance}(j,k)/\lambda)$$ [1]

wherein amp(j,k)=RCS of each joint j at time series k
j=denotes the joint ID
k=denotes the time series.
Distances(j·k)=Distance between Radar location and joint j at time series k.

In an embodiment, using the information from the computed RCS of ellipsoids and the computed distance information of each joint, the method disclosed generates a plurality of radar micro doppler signatures for different gestures of the identified user or the identified another user. For implementing the proposed methodology, the simulation radar returns must be comparable with hardware radar returns. In an example implementation, by referring to FIG. 8A through 8B, a graphical example of the generated plurality of radar micro doppler signatures (spectrogram) in a simulation system and a hardware system may be referred.

According to an embodiment of the present disclosure, at step 304, the one or more hardware processors 104 are configured to compute, using the 2D reference database, a displacement and a time of the detected gestures by implementing a pattern matching technique, wherein the displacement corresponds to span of limbs of the detected gesture, and wherein the time is time taken to perform the detected gesture. Different speeds correspond to different displacement and time for which the detected gesture is performed. Varying displacement may thus be obtained by manipulating the individual joint trajectories of the initial data (or the sensor data), and varying time may be obtained by increasing/decreasing the sampling rate of the initial data.

According to an embodiment of the present disclosure, the one or more hardware processors 104 compute a spectrogram of the buffered data simultaneously when the 2D reference database is generated. A comparison of the spectrogram of the buffered data with a spectrogram of the 2D reference database may then be performed, and the spectrogram in the reference database, which has maximum similarity with a buffered data, is selected. The pattern matching technique thus gives the speed of the gesture performed, specific in terms of both displacement and time, wherein firstly, time for performing each gesture is computed and compared with similar spectrogram contour B from reference dataset, and once time based matching is done, displacement based matching of the spectrogram A and B is performed.

A 2D matrix of displacement vis-à-vis time is generated. The contour of a spectrogram may be interpreted to know its speed in terms of displacement and time. Movement of different limbs in different ways (angle w.r.t. radar, speed of a gesture) causes a distinguished spectrogram pattern to be generated. By referring for FIG. 9A through 9G, an example of the flow of the pattern matching technique for obtaining the speed of the gesture performed, specific in terms of both displacement and time may be referred. Further, by referring for FIG. 6 yet again, an example of a complete data extrapolation with different speeds of the detected gestures (in the 2D reference database) computed by implementing the method disclosed may be referred.

According to an embodiment of the present disclosure, at step 305, the one or more hardware processors 104 are configured to reconstruct, using the computed displacement and time of the detected gestures, a video of the identified user or of the another user performing the detected gestures in 3D via the configurable panel radar system. Further, as discussed supra, the corresponding trajectories of skeleton joints for the detected gestures are obtained via the first modelling. The trajectories are finally animated with the computed displacement and time, thereby facilitating the video reconstruction of the identified user or of the identified another user in 3D. By referring to FIG. 9 again, the reconstructed video by implementing the proposed methodology may be referred.

Figure 10A:
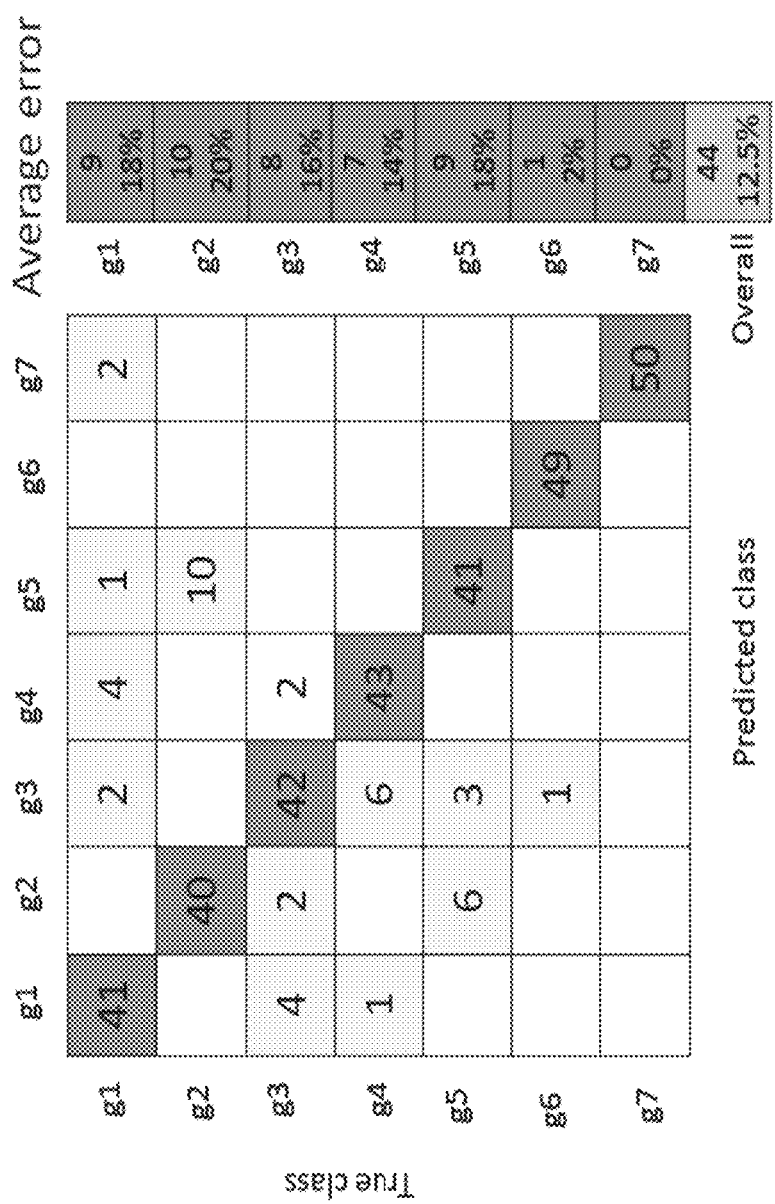
FIG. 10A through 10B illustrates performance results obtained using the method disclosed (by implementing the configurable panel radar system) and by implementing traditional systems and methods using a single radar systems and the corresponding confusion matrices, in accordance with some embodiments of the present disclosure.
Figure 10B:
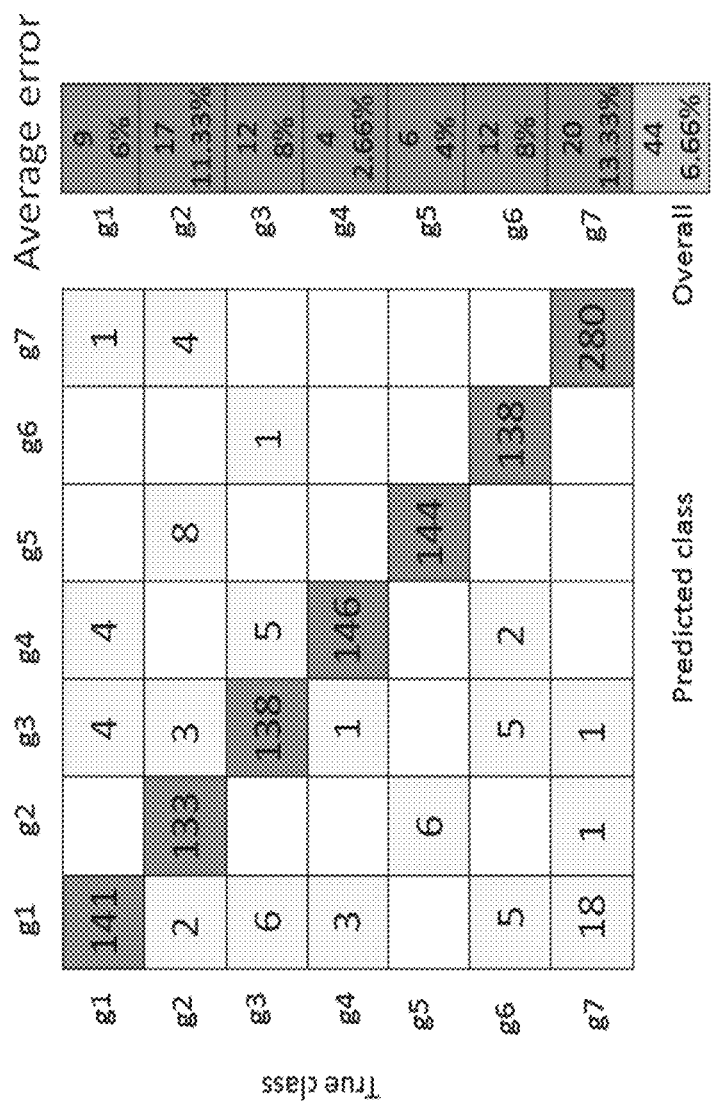
Figure 11:
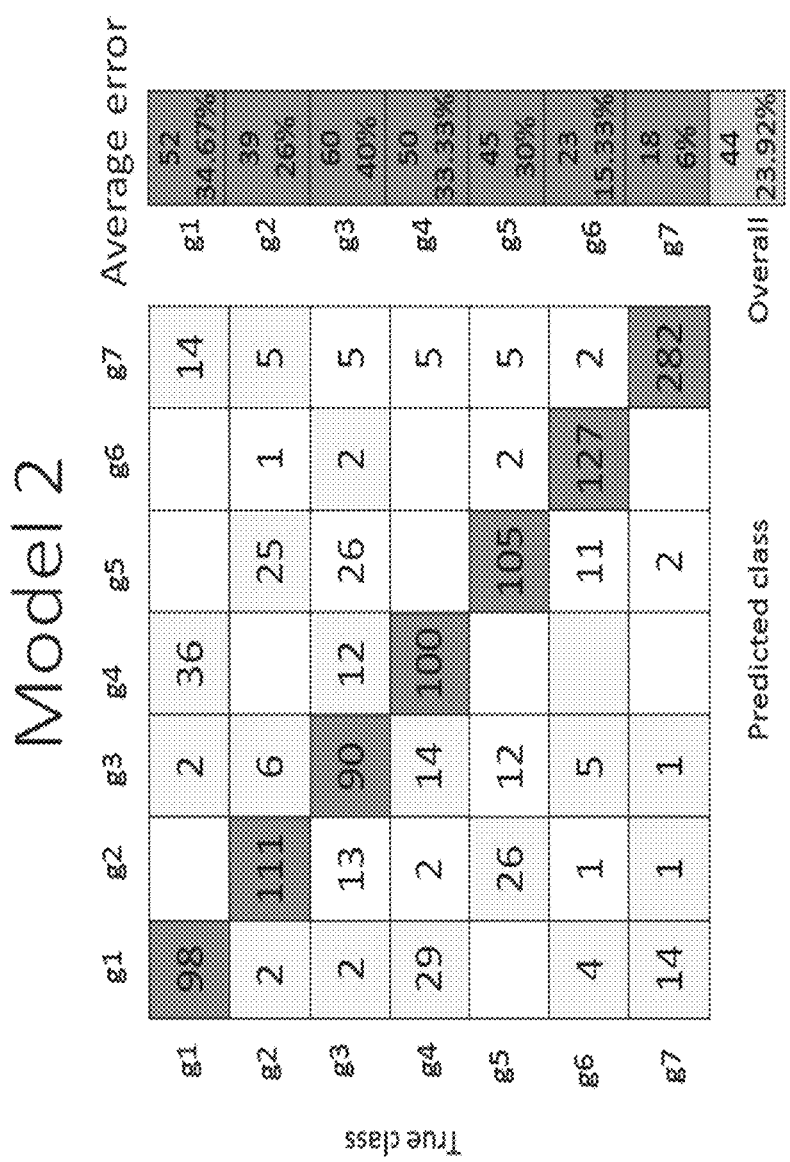
FIG. 11 illustrates the performance results obtained by implementing the method disclosed on an untrained dataset, in accordance with some embodiments of the present disclosure.

According to an embodiment of the present disclosure, a comparison of the method disclosed with the traditional systems and methods may be considered in detail via experimental data. Using the configurable panel radar system discussed supra, the sensor data was collected from 20 users (or subjects) for 7 gestures. Each gesture was captured for 20 seconds. For classifying the gesture, the machine learning classification technique Quadratic Support Vector Machine (SVM) (or bagged tree) classifier was implemented. For training, data of only 15 subjects was used. The window size used for training was 2 sec. The 7 gestures were performed by the users as below:

gesture 1—Swinging right leg;
gesture 2—Hands exercising inward and outward, parallel to ground;
gesture 3—Swinging right leg and right hand;
gesture 4—Stamping both feet sequentially on the ground;
gesture 5—Hands swinging, the way they do, while walking;
gesture 6—Moving Hand & Leg like walking, but the position of the subject is fixed; and
gesture 7—Standing still The features used for training the model comprised a correlation between both the radar signals, maximum Doppler frequency, doppler signal Energy, frequency envelope of spectrogram, correlation between frequency envelope of both radar signals and time domain statistical features such as mean, variance, Kurtosis, skewness, and the like for both the radars. By referring to Table 1 below, the performance results obtained using the method disclosed (implementing the configurable panel radar system) and by implementing traditional systems and methods implementing a single radar based techniques may be referred. Further, by referring to FIG. 10A through FIG. 10B, the corresponding confusion matrix may be referred. By referring to Table 1 and FIG. 10A through FIG. 10B again, it may be noted that the method disclosed results in a high level of accuracy (of 93.3%). FIG. 10A through FIG. 10B yet gain, it may be noted that the number in the grids represents the windows taken for that class.

TABLE 1

| Technique | Accuracy | Confusion matrix |
| --- | --- | --- |
| Proposed methodology | 93.3% | Model 1 (FIG. 10A) |
| Traditional radar based technique | 76.1% | Model 1 (FIG. 10B) |

In an embodiment, for testing the performance of the method disclosed on untrained dataset, the proposed methodology was tested on 5 users, wherein each of the five user was not a part of the user dataset. By referring to FIG. 11, the corresponding results obtained by implementing the method disclosed may be referred. By referring to FIG. 11, it may be noted that the method disclosed, by implementing the machine learning classification technique (comprising the first classification model and the second classification model) predicts the gesture in each window of 2 seconds, which are then stitched together to form episodes, for example, of 5 seconds duration each. For generating initial results, the method disclosed considered performing the reconstruction of gesture on a single user. Thus, the corresponding 2D database is selected from the complete reference database.

For computing the displacement and time of the detected gestures, the pattern matching technique was implemented, wherein the incoming data is pattern matched with the corresponding reference pattern for different time and displacement. As mentioned supra, by referring to FIG. 9A through FIG. 9G again, the flow of the implemented pattern matching technique may be referred. FIG. 9A corresponds to the experimental data pattern. Initially, the experimental pattern may be compared with reference patterns in FIG. 9B, FIG. 9C and FIG. 9D, based upon time.

Upon performing the time based pattern matching, the displacement based matching is performed, wherein the data pattern in FIG. 9A is matched between FIG. 9E through 9G, to find the displacement. In this way, both time based matching and displacement based matching is computed. There may be many patterns between FIG. 9B through FIG. 9G. Finally, by feeding the corresponding metadata, the 3D reconstruction may be performed.

According to an embodiment of the present disclosure, some of the advantages of the method disclosed may be considered in detail. As discussed supra, the method disclosed provides for a complete end-to-end solution for the 3D reconstruction for the visual analysis and monitoring using the human body model. The method disclosed cites a multi-radar correlation analysis via the radar configurable panel radar system which identifies which part of the body is moved with a very high level of accuracy. The method disclosed also cites reconstructing of the human gestures from radar signatures. Further, as discussed supra, the simulating facilitates computing radar signatures of top and bottom parts of the body separately, which may then be used for a comparison with the radar signatures of physical configurable panel radar system. Finally, the method disclosed provides for a cost efficient solution for good accurate human gesture detection.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein addresses unresolved problem of human activity detection and 3D reconstruction of humans using the two system radar or multiple radars. The embodiment, thus provides for computing, using the 2D reference database, the displacement and the time of the detected gestures by implementing the pattern matching technique, and reconstructing, using the computed displacement and time of the detected gestures, the video of the identified user or of the another user performing the detected gestures in 3D. Moreover, the embodiments herein further provides for performing the comparison of the spectrogram of the buffered data with the spectrogram of the 2D reference database to compute the displacement speed and the time speed of the detected gestures, the first modelling of trajectory of different joints for human gestures based upon the sensor data of the identified user or the identified another user, and the second modelling of joints and a modelling of segments between the joints of the identified user or the identified another user as ellipsoids. The method disclosed uses multiple radars such that it facilitates decoupling of the top body and body movements (as discussed supra). The panel radar consist of many possible radars at different locations placed vertically (as discussed supra in step 301). Depending upon certain parameters such as the distance of the subject from the radars, average height deviation of subjects of interest etc., the location of the configurable panel radar system from a panel of radars may be selected. Finally, the method disclosed may also be executed in multi-channel radars.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for three-dimensional (3D) reconstruction of human gestures from radar based measurements, the method comprising:

acquiring, by one or more hardware processors, a time series data on radar measurements of gestures being performed by a plurality of users corresponding to a user database, wherein the time series data is acquired by implementing a configurable panel radar system (301);

performing, by implementing a machine learning classification technique on the acquired time series data, a plurality of steps, wherein the plurality of steps comprise (302):

identifying a user amongst the plurality of users that performed a gesture;

classifying the identified user as an identified first user upon determining that the identified user corresponds to the user database;

classifying the identified user as an identified second user upon determining that the identified user does not corresponds to the user database;

generating a metadata corresponding to the identified second user; and detecting the gestures performed by the identified first user or the identified second user, wherein the detected gestures comprise a corresponding set of gesture labels;

generating, by simulating the set of gesture labels, a sensor data and the generated metadata, a two-dimensional (2D) reference database of different speeds of the detected gestures, wherein the sensor data corresponds to the identified first user or the identified second user (303);

computing, using the 2D reference database, a displacement and a time of the detected gestures by implementing a pattern matching technique; wherein the displacement corresponds to span of limbs of the detected gesture, and wherein the time is time taken to perform the detected gesture (304); and reconstructing, using the computed displacement and time of the detected gestures, a video of the identified first user or of the identified second user performing the detected gestures in 3D via the configurable panel radar system (305).

2. The method as claimed in claim 1, wherein the pattern matching technique comprises performing a comparison of a spectrogram of a buffered data with a spectrogram of the 2D reference database to compute the displacement speed and the time speed of the detected gestures, and wherein the buffered data corresponds to the time series data.

3. The method as claimed in claim 1, wherein the step of simulating comprises a first modelling of trajectory of different joints for human gestures based upon the sensor data of the identified first user or the identified second user.

4. The method as claimed in claim 1, wherein the step of simulating further comprises a second modelling of joints and a modelling of segments between the joints of the identified first user or the identified second user as ellipsoids.

5. The method as claimed in claim 4, wherein the step of second modelling comprises generating, based upon the ellipsoids, a plurality of radar micro doppler signatures for different gestures of the identified first user or the identified second user.

6. The method as claimed in claim 5, wherein the step of generating the plurality of radar micro doppler signatures is preceded by computing a Radar Cross Section (RCS) and a distance information of each ellipsoid for reconstructing the 3D video of the identified first user or of the identified second user.

7. The method as claimed in claim 1, wherein the configurable panel radar system facilitates analyzing, based upon the detected gesture, the top and the bottom parts of the body of the identified first user or of the identified second user separately.

8. The method as claimed in claim 7, wherein the step of analyzing is executed by a vertical placement of a plurality of radars at a predefined distance from each other for illuminating the top and the bottom parts of the body of the identified first user or of the identified second user separately, and wherein the plurality of radars correspond to the configurable panel radar system.

9. A system (100) for three-dimensional (3D) reconstruction of human gestures from radar based measurements, the system (100) comprising:
a memory (102) storing instructions;
one or more communication interfaces (106); and
one or more hardware processors (104) coupled to the memory (102) via the one or more communication interfaces (106), wherein the one or more hardware processors (104) are configured by the instructions to:
acquire a time series data on radar measurements of gestures being performed by a plurality of users corresponding to a user database, wherein the time series data is acquired by implementing a configurable panel radar system;
perform, by implementing a machine learning classification technique on the acquired time series data, a plurality of steps, wherein the plurality of steps comprise:
identify a user amongst the plurality of users that performed a gesture;
classifying the identified user as an identified first user upon determining that the identified user corresponds to the user database;
classifying the identified user as an identified second user upon determining that the identified user does not corresponds to the user database;
generate a metadata corresponding to the identified second user; and
detect the gestures performed by the identified first user or the identified second user, wherein the detected gestures comprise a corresponding set of gesture labels;
generate, by simulating the set of gesture labels, a sensor data and the generated metadata, a two-dimensional (2D) reference database of different speeds of the detected gestures, wherein the sensor data corresponds to the identified first user or the identified second user;
compute, using the 2D reference database, a displacement and a time of the detected gestures by implementing a pattern matching technique; wherein the displacement corresponds to span of limbs of the detected gesture, and wherein the time is time taken to perform the detected gesture; and
reconstruct, using the computed displacement and time of the detected gestures, a video of the identified first user or of the identified second user performing the detected gestures in 3D via the configurable panel radar system.

10. The system (100) as claimed in claim 9, wherein the one or more hardware processors (104) are configured to implement the pattern matching technique by performing a comparison of a spectrogram of a buffered data with a spectrogram of the 2D reference database to compute the displacement speed and the time speed of the detected gestures, and wherein the buffered data corresponds to the time series data.

11. The system (100) as claimed in claim 9, wherein the step of simulating comprises a first modelling of trajectory of different joints for human gestures based upon the sensor data of the identified first user or the identified second user.

12. The system (100) as claimed in claim 9, step of simulating further comprises a second modelling of joints and a modelling of segments between the joints of the identified first user or the identified second user as ellipsoids.

13. The system (100) as claimed in claim 12, wherein the one or more hardware processors (104) are configured to perform the second modelling by generating, based upon the ellipsoids, a plurality of radar micro doppler signatures for different gestures of the identified first user or the identified second user.

14. The system (100) as claimed in claim 13, wherein the step of generating the plurality of radar micro doppler signatures is preceded by computing a Radar Cross Section (RCS) and a distance information of each ellipsoid for reconstructing the 3D video of the identified first user or of the identified second user.

15. The system (100) as claimed in claim 9, wherein the configurable panel radar system facilitates analyzing, based upon the detected gesture, the top and the bottom part of the body of the identified first user or of the identified second user separately.

16. The system (100) as claimed in claim 15, wherein the step of analyzing is executed by a vertical placement of a plurality of radars at a predefined distance from each other for illuminating the top and the bottom parts of the body of the identified first user or of the identified second user separately, and wherein the plurality of radars correspond to the configurable panel radar system.

17. One or more non-transitory machine readable information storage mediums comprising one or more instructions which when executed by one or more hardware processors cause:
acquiring, by one or more hardware processors, a time series data on radar measurements of gestures being performed by a plurality of users corresponding to a user database, wherein the time series data is acquired by implementing a configurable panel radar system (301);

performing, by implementing a machine learning classification technique on the acquired time series data, a plurality of steps, wherein the plurality of steps comprise (302):

identifying a user amongst the plurality of users that performed a gesture;

classifying the identified user as an identified first user, upon determining that the identified user corresponds to the user database;

classifying the identified user as an identified second user upon determining that the identified user does not corresponds to the user database;

generating a metadata corresponding to the identified second user; and detecting the gestures performed by the identified first user or the identified second user, wherein the detected gestures comprise a corresponding set of gesture labels;

generating, by simulating the set of gesture labels, a sensor data and the generated metadata, a two-dimensional (2D) reference database of different speeds of the detected gestures, wherein the sensor data corresponds to the identified first user or the identified second user (303);

computing, using the 2D reference database, a displacement and a time of the detected gestures by implementing a pattern matching technique; wherein the displacement corresponds to span of limbs of the detected gesture, and wherein the time is time taken to perform the detected gesture (304); and reconstructing, using the computed displacement and time of the detected gestures, a video of the identified first user or of the identified second user performing the detected gestures in 3D via the configurable panel radar system (305).

18. The one or more non-transitory machine readable information storage mediums of claim 17, wherein the pattern matching technique comprises performing a comparison of a spectrogram of a buffered data with a spectrogram of the 2D reference database to compute the displacement speed and the time speed of the detected gestures, and wherein the buffered data corresponds to the time series data.

19. The one or more non-transitory machine readable information storage mediums of claim 17, wherein the step of simulating comprises a first modelling of trajectory of different joints for human gestures based upon the sensor data of the identified first user or the identified second user.

20. The one or more non-transitory machine readable information storage mediums of claim 17, wherein the step of simulating further comprises a second modelling of joints and a modelling of segments between the joints of the identified first user or the identified second user as ellipsoids.

* * * * *